US009121213B2

(12) United States Patent
Sakai

(10) Patent No.: US 9,121,213 B2
(45) Date of Patent: Sep. 1, 2015

(54) SWITCHING MECHANISM

(71) Applicant: AISIN SEIKI KABUSHIKI KAISHA, Kariya-shi (JP)

(72) Inventor: Toshiyuki Sakai, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 149 days.

(21) Appl. No.: 14/036,319

(22) Filed: Sep. 25, 2013

(65) Prior Publication Data

US 2014/0083226 A1 Mar. 27, 2014

(30) Foreign Application Priority Data

Sep. 27, 2012 (JP) ................................ 2012-213479
Feb. 21, 2013 (JP) ................................ 2013-031846

(51) Int. Cl.

*B60J 5/04* (2006.01)
*E05F 3/22* (2006.01)
*E05F 3/16* (2006.01)
*E05F 5/02* (2006.01)
*E05F 5/04* (2006.01)

(52) U.S. Cl.

CPC ... *E05F 3/22* (2013.01); *E05F 3/16* (2013.01); *E05F 5/02* (2013.01); *E05F 5/04* (2013.01); *Y10T 74/2011* (2015.01)

(58) Field of Classification Search

USPC ....... 188/82.7, 82.77, 181 T, 184, 186; 16/49; 49/322; 192/105 BA, 105 CD, 105 CE, 192/105 CF, 105 R

See application file for complete search history.

(56) References Cited

U.S. PATENT DOCUMENTS

| | | | | | |
|---|---|---|---|---|---|
| 1,492,938 | A | * | 5/1924 | Rotter et al. | 188/186 |
| 2,345,471 | A | * | 3/1944 | Goff et al. | 188/186 |
| 2,685,946 | A | * | 8/1954 | Pferd et al. | 188/184 |
| 3,576,242 | A | * | 4/1971 | Mumma | 193/35 A |
| 3,738,456 | A | * | 6/1973 | Russell et al. | 188/184 |
| 3,856,119 | A | * | 12/1974 | Harrington | 188/82.3 |
| 4,282,953 | A | * | 8/1981 | Lichti et al. | 188/189 |
| 4,919,238 | A | * | 4/1990 | Skipper | 188/186 |

FOREIGN PATENT DOCUMENTS

| | | | |
|---|---|---|---|
| DE | 202005020087 | U1 | 5/2007 |
| DE | 202007015597 | U1 | 4/2009 |
| DE | 102008061117 | A1 | 6/2010 |
| DE | 202010006168 | U1 | 1/2012 |

(Continued)

*Primary Examiner* — Christopher Schwartz
(74) *Attorney, Agent, or Firm* — Buchanan Ingersoll & Rooney PC

(57) ABSTRACT

A switching mechanism includes a main body, a rotational body, a swinging member, and a biasing member. The swinging member detaches from the shaft portion against a biasing force of the biasing member by a centrifugal force generated at the swinging member in response to rotation of the rotational body rotating in conjunction with movement of the rotational member, for example, a vehicle door, to switch the state of the switching mechanism to an operation allowed state in a state where the rotational member is operated to rotationally move. The biasing force of the biasing member pushes the swinging member to make contact with the shaft portion and engages with the shaft portion by friction to retain the rotational body in a stopped state to switch the state of the switching mechanism to a movement restrained state in a state where the rotational member is stopped from making rotational movement.

15 Claims, 9 Drawing Sheets

(56) References Cited

FOREIGN PATENT DOCUMENTS

| | | | |
|---|---|---|---|
| JP | 3816511 | B | 8/2006 |
| JP | 2006-265982 | A | 10/2006 |
| JP | 2009-235844 | A | 10/2009 |
| JP | 2010-95855 | A | 4/2010 |
| WO | WO 2009/059747 | A1 | 5/2009 |

* cited by examiner

SWITCHING MECHANISM

CROSS REFERENCE TO RELATED APPLICATIONS

This application is based on and claims priority under 35 U.S.C. §119 to Japanese Patent Application 2012-213479, filed on Sep. 27, 2012, and to Japanese Patent Application 2013-031846, filed on Feb. 21, 2013, the entire content of which are incorporated herein by reference.

TECHNICAL FIELD

This disclosure generally relates to a switching mechanism to be arranged between a retaining member and a rotational member, the switching mechanism switching a state between an operation allowed state where movement of the rotational member is allowed and a movement restrained state where the movement of the rotational member is retained at a selected stopped position.

BACKGROUND DISCUSSION

A door position restraining apparatus for restraining a position of an opened door in a door apparatus for a vehicle provided with a hinge is disclosed in JP2009-235844A, hereinafter referred to as Reference 1. Reference 1 discloses an apparatus using an opening-closing movement of a door to switch a state of the apparatus between a movement restraining mode and a movement allowing mode without using an actuator. More specifically, the apparatus includes a movement restraining mechanism that switches the state of the restraining mechanism to the movement restraining mode in response to rotation of a change ring rotating in a first direction by an operation where movement of opening the door is stopped at an intermediate position followed by moving the door slightly in a closing direction. Furthermore, in a state where the door is moved in a direction to fully close the door, the change ring is driven in a second direction in response to the door closing operation so that the movement restraining mechanism switches to the movement allowing mode. In other words, the apparatus disclosed in Reference 1 switches the state of the apparatus between the movement restraining mode and the movement allowing mode without using an actuator by making use of a manually operated door closing operation.

In JP2010-95855A, hereinafter referred to as Reference 2, a door opening-closing retaining apparatus that retains a door at a selected opening degree is disclosed. Reference 2 discloses an apparatus to improve door opening-closing operation performance by providing simple and comfortable operation by restraining a check force from being exerted while opening and closing the door. More specifically, during a period during which the door is operated to open, an engagement release operation member is operated to disengage a checking mechanism so that the door is smoothly opened in a state where the check force is not exerted. During a period during which the door is operated to close, closing operation of the door disengages the checking mechanism. In other words, without an independent procedure to operate the engagement release operation member, the door may be closed.

Furthermore, an automatic opening-closing apparatus for a vehicle for an application of a power back door, which is a back door for a vehicle provided with a drive source, is disclosed in JP2006-265982A, hereinafter referred to as Reference 3. Reference 3 discloses an apparatus to improve opening-closing operation performance of an opening-closing body in a manual operation by allowing the opening-closing body to be manually operated to open, to close and to stay still in an intermediate position by an operation at a single operation portion. More specifically, the automatic opening-closing apparatus for a vehicle is described as an apparatus for automatically opening and closing the opening-closing body mounted on a vehicle body in a state where the opening-closing body freely makes opening and closing movements in upward-downward direction via a hinge. The automatic opening-closing apparatus for a vehicle includes a drive source for driving the opening-closing body to open and to close, an opening-closing operation portion, which is operated by an operator, arranged on the opening-closing body, an auxiliary opening force generating means arranged between the vehicle body and the opening-closing body and biasing the opening-closing body in an opening direction, and a clutch arranged between the opening-closing body and the drive source and selectively connecting a power transmission path between the opening-closing body and the drive source by an operation of the opening-closing operation portion. In a state where the clutch is in a disconnected state, even in a case where the opening-closing operation portion is operated, the automatic opening-closing apparatus for a vehicle maintains the clutch in a disconnected state during a period during which the opening-closing body is within a range within which the opening-closing body is recognized as closed and during a period during which the opening-closing body is within a range within which the opening-closing body is recognized as open. Note that, the range within which the opening-closing body is recognized as closed is a range where the opening-closing body is at a position between fully closed position and a position where the opening-closing body is half-latched. The range within which the opening-closing body is recognized as open is a range where the opening-closing body is at a position between fully opened position and a predetermined position.

In addition, a door retaining control apparatus for a sliding door of a vehicle for an application of a power sliding door for a vehicle is disclosed in JP3816511B, hereinafter referred to as Reference 4. Reference 4 discloses an apparatus to retain a sliding door with a transmitted retaining force that is appropriate for manually operating the sliding door to open and close while retaining the sliding door immovable by self-weight under any condition. More specifically, the door retaining control apparatus for a sliding door of a vehicle includes a sliding door to be moved by a sliding door moving mechanism and moved on a guide track arranged on a vehicle to open and close the sliding door, a clutch mechanism selectively transmitting power from a drive source to the sliding door moving mechanism, a movement detection means detecting movement of the sliding door, and a clutch control means adjusting the transmitted retaining force at the clutch mechanism. The clutch control means adjusts the transmitted retaining force to restrain movement of the sliding door when the clutch control means receives an output from the movement detection means and detects that the sliding door has further moved in a direction toward opening the sliding door from a fully opened position or from a position close to the fully opened position. Then, after a predetermined time has elapsed, the clutch control means adjusts the transmitted retaining force to minimum, which is a smallest force required for retaining the sliding door in a non-moving state.

Furthermore, a drive system for opening and closing, for example, a tail gate or a trunk of a vehicle is disclosed in WO2009059747A, hereinafter referred to as Reference 5. Reference 5 discloses an apparatus including a connecting apparatus connected to an electric motor in a driving side and to a closing member in an output side. The connecting apparatus includes a first friction engagement element providing pushing pressure on a contact surface of a non-moving member and a second friction engagement element connecting a driving element to the driven element and configured to provide pushing pressure on a contact surface of a transmission element. In a state where the drive system is driven by an electric motor, the second friction engagement element transmits torque, which is generated in the driving side, from the driving element to the driven element. In a state where the closing member of the drive system is manually operated, the transmission element transmits torque generated in the driven side to the first friction engagement element so that restraint on the contact surface is released. Note that, from drawings in Reference 5, the closing member is a tailgate, or a back door, and the friction engagement elements are coil springs.

The door position restraining apparatus disclosed in Reference 1 requires an operation where movement of opening the door is stopped at an intermediate position followed by moving the door slightly in the closing direction in order to bring the door position restraining apparatus to the movement restraining mode. In addition, an operation to move the door in the closing direction is required to switch the door position restraining apparatus from the movement restraining mode to the movement allowing mode. Furthermore, the door position restraining apparatus disclosed in Reference 1 is not allowed to operate the door in the opening direction from the state in which the door position restraining apparatus is in the movement restraining mode. Accordingly, an operation performance of the apparatus disclosed in Reference 1 leaves room for improvement. Furthermore, the door opening-closing retaining apparatus disclosed in Reference 2 requires an operation of the engagement release operation member to release the door from a retained state. Accordingly, an operation performance of the apparatus disclosed in Reference 2 leaves room for improvement. In a case where a rotational member in the apparatus disclosed in Reference 1 or in Reference 2 is a door and a retaining member in the apparatus disclosed in Reference 1 or in Reference 2 is a vehicle body member, a switching mechanism is required to smoothly switch between an operation allowed state, which is a state where movement of the rotational member is allowed, and a movement restrained state, which is a state where the movement of the rotational member is retained at a selected stopped position, with a simple operation and to reliably retain the movement restrained state.

Each of the apparatuses disclosed in Reference 3 through 5 uses an electric motor as a drive source and furthermore requires a clutch mechanism. A clutch mechanism, in general, is defined as a mechanism that selectively transmits power from an engine body to a driven body, which is a mechanism that manually or automatically connects and disconnects between the engine body and the driven body to engage and disengage the engine body and the driven body. The clutch mechanism is mainly divided into two types, which are a positive clutch that engages by engaging teeth and a friction clutch that engages by friction. In each type, the clutch mechanism engages to transmit power from the engine body to the driven body and disengages to stop transmitting power. The friction clutch transmits rotation by frictional resistance, or frictional force. Accordingly retaining a frictional state while transmitting power is considered important. In a state where the power is not transmitted, the friction clutch is in a disengaged state. A separate consideration is required for retaining the friction clutch in the disengaged state, which is a state in which the operation of the friction clutch is stopped.

Particularly in each of References 3 and 4, an electromagnetic type clutch is used as a clutch mechanism. Accordingly, an electrical control is required to retain the clutch in a state in which the operation of the friction clutch is stopped. In addition, in each of References 3 and 4, a worm reducer, which is low in efficiency, is used. Accordingly, a large output type electric motor is required and the apparatus becomes large in size, heavy in weight, high in cost, and large in power consumption. In comparison, a size of an electric motor may be reduced in the system disclosed in Reference 5. Nevertheless, the system in Reference 5 is configured to increase a retaining force for retaining a tailgate. Power required for operation during manual operation of the tailgate has increased as much as the retaining force increased to retain the tailgate. Accordingly, a manual operation performance is decreased. In a state where the system is driven by a motor, sliding movement of coil springs results in resistive loss, which leads to a difficulty in reducing size and reducing power consumption.

A need thus exists for a switching mechanism, which is not susceptible to the drawbacks mentioned above.

SUMMARY

A switching mechanism to be arranged between a retaining member and a rotational member configured to make rotational movement relative to the retaining member, the switching mechanism switching a state between an operation allowed state where movement of the rotational member is allowed and a movement restrained state where the rotational member is retained at a selected stopped position includes a main body including a shaft portion and attaching to the retaining member, a rotational body in a rotatably supported state and connecting to the rotational member, the rotational body rotating independently from the main body with the shaft portion as center of rotation, a swinging member swingably supported on the rotational body, the swinging member making contact with and detaching from the shaft portion in response to swinging movement of the swinging member, and a biasing member retained on the rotational body, the biasing member biasing the swinging member toward central axis of the shaft portion. The swinging member detaches from the shaft portion against a biasing force of the biasing member by a centrifugal force generated at the swinging member in response to rotation of the rotational body rotating in conjunction with movement of the rotational member to switch the state of the switching mechanism to the operation allowed state in a state where the rotational member is operated to rotationally move. The biasing force of the biasing member pushes the swinging member to make contact with the shaft portion and engages with the shaft portion by friction to retain the rotational body in a stopped state to switch the state of the switching mechanism to the movement restrained state in a state where the rotational member is stopped from making rotational movement.

A switching mechanism to be arranged between a retaining member and a rotational member configured to make rotational movement relative to the retaining member, the switching mechanism switching a state between an operation allowed state where movement of the rotational member is allowed and a movement restrained state where the rotational member is retained at a selected stopped position includes a main body including a shaft portion formed in a hollow cylinder form and attaching to the retaining member, a driving motor including an output shaft inserted through the shaft portion, the driving motor to be fixed to the main body, a rotational body in a rotatably supported state and connecting to the rotational member, the rotational body rotating independently from the main body with the shaft portion as the center of rotation, a swinging member swingably supported on the rotational body, the swinging member making contact with and detaching from the shaft portion in response to swinging movement of the swinging member, a biasing member retained on the rotational body, the biasing member biasing the swinging member toward central axis of the shaft portion, and a cam member connected to the output shaft, the cam member pushing the swinging member in a direction that makes the swinging member move away from the output shaft against the biasing force of biasing member in response to rotation of the output shaft. The biasing force of the biasing member pushes the swinging member to make contact with the shaft portion and engages with the shaft portion by friction to retain the rotational body in a stopped state in a state where the driving motor is not driven. The swinging member detaches from the shaft portion in response to the rotation of the output shaft via the cam member to switch the state of the switching mechanism to the operation allowed state in a state where the driving motor is driven. The swinging member detaches from the shaft portion against the biasing force of the biasing member by a centrifugal force generated at the swinging member in response to rotation of the rotational body rotating in conjunction with movement of the rotational member to switch the state of the switching mechanism to the operation allowed state in a state where the driving motor is not driven and the rotational member is manually operated to rotationally move.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 4:
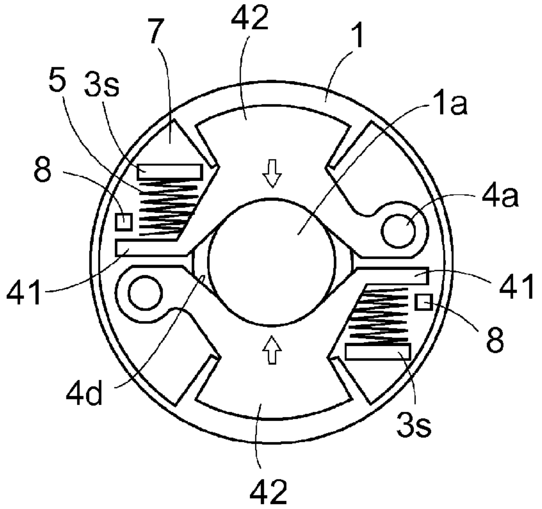
FIG. 4 is a cross-sectional view drawing taken along line IV-IV in FIG. 1 illustrating the first embodiment of the switching mechanism with a rotational body in a stopped state.
Figure 5:
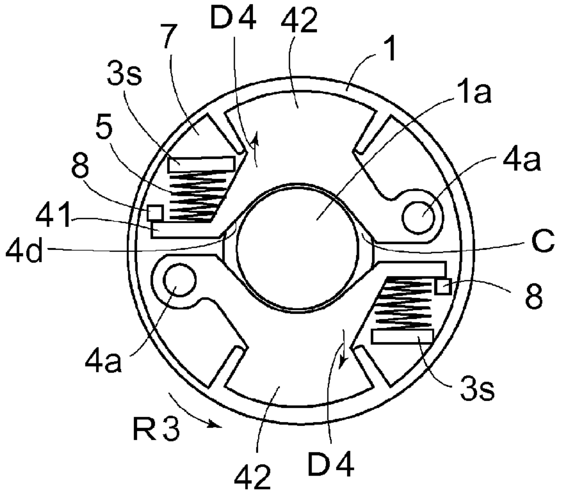
FIG. 5 is a cross-sectional view drawing taken along line V-V in FIG. 1 illustrating the first embodiment of the switching mechanism in a state where the switching mechanism is manually operated.
Figure 6:
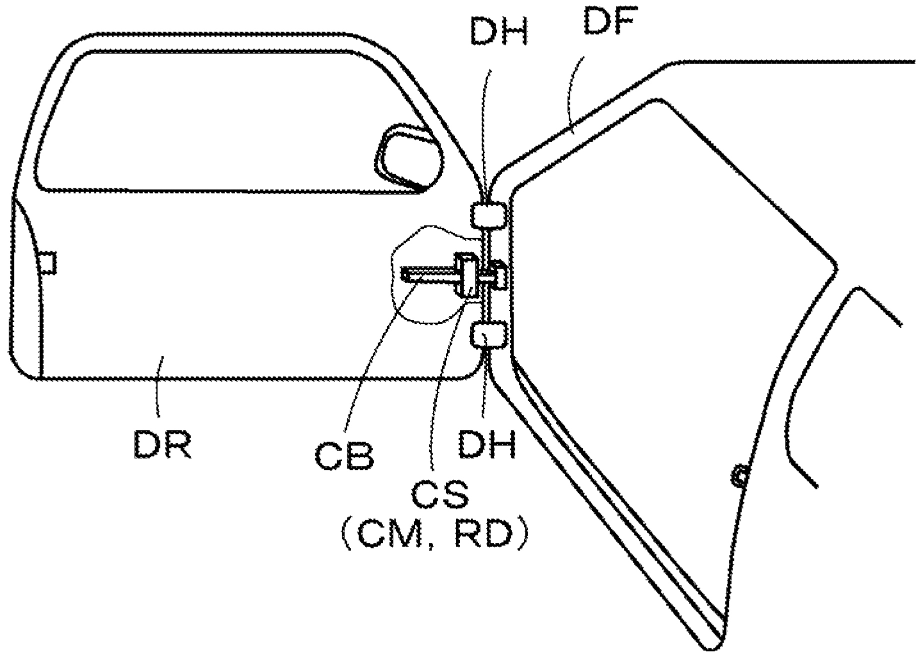
FIG. 6 is a perspective view drawing illustrating a door apparatus of a vehicle installed with the first embodiment of the switching mechanism with a portion of the door apparatus being cut out.

Favorable embodiments of a switching mechanism CM, TM will be described referring to drawings. FIGS. 1 through 5 illustrate the switching mechanism CM according to a first embodiment. FIG. 6 illustrates a door apparatus of a vehicle provided with the first embodiment of the switching mechanism as an example. As FIG. 6 illustrates, a door DR serves as a rotational member and a door frame DF, which is a vehicle body component that rotatably supports the door DR, serves as a retaining member. The switching mechanism CM according to the first embodiment is arranged between the door DR and the door frame DF and switches a state between an operation allowed state and a movement restrained state in response to an opening-closing operation of the door DR. The door apparatus will be described later.

Figure 1:
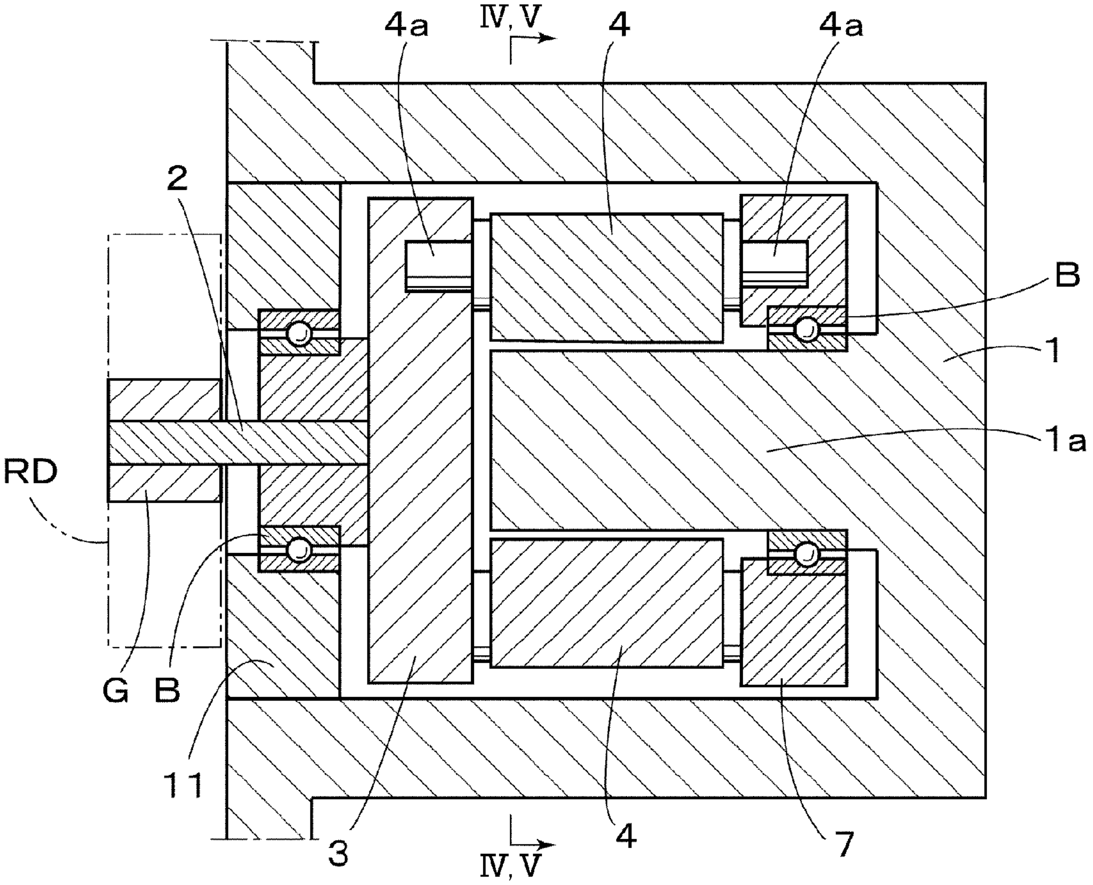
FIG. 1 is a cross-sectional view drawing taken in an upward-downward direction illustrating a first embodiment of a switching mechanism.
Figure 2:
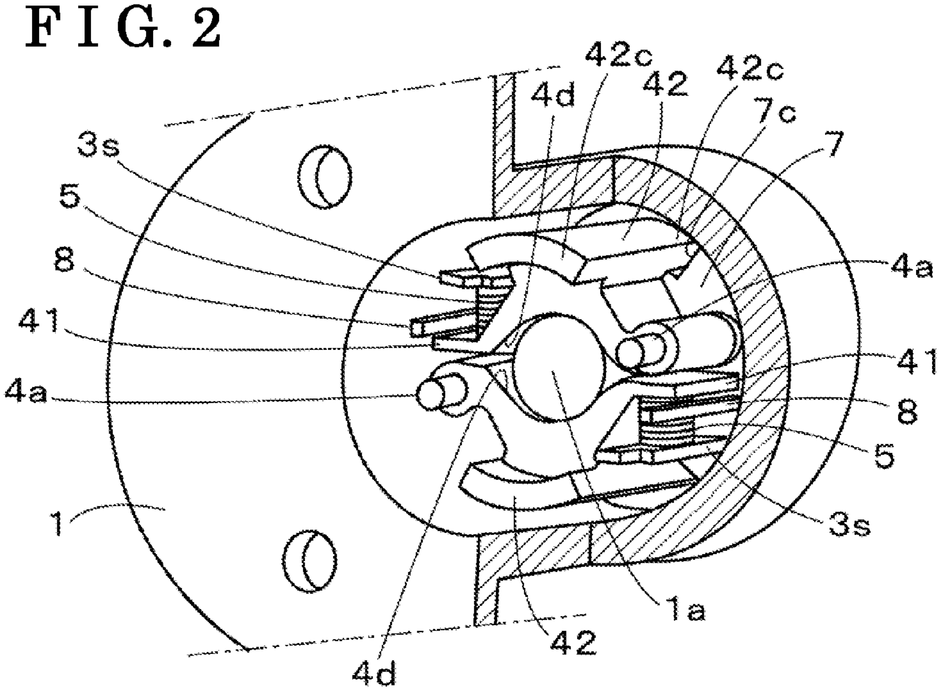
FIG. 2 is a perspective view drawing illustrating the first embodiment of the switching mechanism with a portion being cut out.
Figure 3:
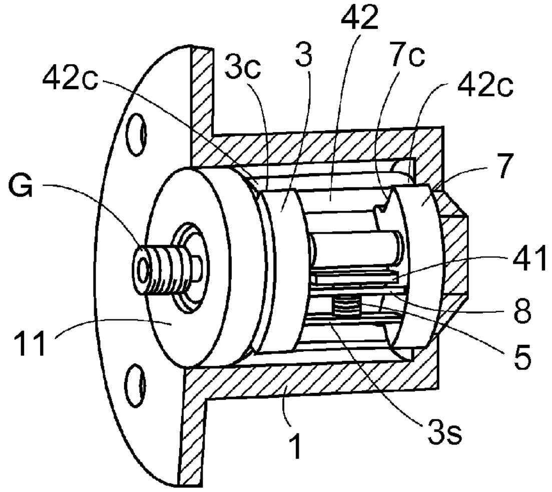
FIG. 3 is another perspective view drawing illustrating the first embodiment of the switching mechanism with a portion being cut out.

As FIGS. 1 through 3 illustrate, the switching mechanism CM according to the first embodiment is basically configured in a housing form by a supporting member 11 fitted to an opening portion of a main body 1 formed in a container form. The main body 1 includes a shaft portion 1*a* formed in a solid cylinder form inside. The supporting member 11 rotatably supports a rotational body 3 rotating independently from the main body 1 with the shaft portion 1*a* as center of rotation. The supporting member 11 connects to the rotational member, for example, the door DR illustrated in FIG. 6, via a connection shaft 2 fixed to the rotational body 3, a gear G, and a gear mechanism RD that meshes with the gear G.

A swinging member 4 is swingably supported on the rotational body 3. The swinging member 4 is arranged such that an inner peripheral surface 4*d*, which is formed to have a semicircular shape in a frontal view, make contact with and detach from outer peripheral surface of the shaft portion 1*a* in response to swinging of the swinging member 4 swinging at a swinging shaft 4*a* as axis. The swinging member 4 includes a lever 41 with one end being rotatably supported and a weight portion 42 arranged on a portion of the lever 41, the portion distantly positioned relative to the shaft portion 1*a*. In the switching mechanism CM according to the first embodiment, a pair of swinging members 4 are symmetrically arranged relative to central axis point of the shaft portion 1*a* with one end of each of a pair of levers 41 being rotatably supported. The swinging members 4 further include a pair of weight portions 42 where each of the pair of weight portions 42 is arranged on a portion of each of the pair of the levers 41, the portion distantly positioned relative to the shaft portion 1*a*. Nevertheless, the swinging member 4 may be arranged singularly and not as a pair. Note that, the lever 41 and the weight portion 42 may be formed integrally or may be formed separately and joined afterwards.

As FIGS. 2 and 3 illustrate, a biasing member 5 is retained between a retaining portion 3*s* arranged on the rotational body 3 and the lever 41 of the swinging member 4 so that the swinging member 4 is biased toward central axis of the shaft portion 1*a*. In the first embodiment of the switching mechanism CM, the biasing member 5 is a pair of coil springs where each of the coil springs is arranged at a position close to a free end portion of each of the pair of levers 41, however, the coil spring may be replaced with, for example, a plate spring or a rubber member.

In the first embodiment of the switching mechanism CM, an auxiliary rotational body 7 is arranged parallel to the rotational body 3. The auxiliary rotational body 7 is rotatably supported on the shaft portion 1*a* of the main body 1. Accordingly, the lever 41 and the weight portion 42 are arranged between the rotational body 3 and the auxiliary rotational body 7. Furthermore, one end of the swinging shaft 4*a* for the lever 41 is supported on the auxiliary rotational body 7 and the other end of the swinging shaft 4*a* for the lever 41 is supported on the rotational body 3. In other words, the lever 41 is retained by each end of the swinging shaft 4*a* being retained, however, the switching mechanism CM may be configured without the auxiliary rotational body 7 and the lever 41 may be retained by one end of the swinging shaft 4*a* alone at the rotational body 3 on condition that an adequate rigidity may be provided to retain the lever 41. Furthermore, the retaining portion 3*s* is retained at each end by the rotational body 3 and the auxiliary rotational body 7. Nevertheless, the retaining portion 3*s* may be in a configuration where the retaining portion 3*s* is retained at one end alone. In addition, the first embodiment of the switching mechanism CM includes a stopper portion 8 restraining swinging of the swinging member 4 at a predetermined swing angle. As FIGS. 2 and 3 illustrate, the stopper portion 8, which is a separate component formed in a stick form, is arranged between the rotational body 3 and the auxiliary rotational body 7, however, the stopper portion 8 may be integrally formed by extrusion with the rotational body 3 or the auxiliary rotational body 7. Note that, bearings are indicated with a reference alphabet B in the drawings. The rotational body 3 is rotatably supported on the supporting member 11 via a bearing B. The auxiliary rotational body 7 is rotatably supported on the shaft portion 1*a* via another bearing B.

In the first embodiment of the switching mechanism CM, the rotational body 3 includes a cut out portion 3*c* and the auxiliary rotational body 7 includes a cut out portion 7*c*. The cut out portion 3*c* is formed by removing a portion from an outer peripheral surface of the rotational body 3. The cut out portion 7*c* is formed by removing a portion from an outer peripheral surface of the auxiliary rotational body 7. Furthermore, the weight portion 42 includes extending portions 42*c*. The extending portions 42*c* extend into the cut out portion 3*c* of the rotational body 3 and the cut out portion 7*c* of the auxiliary rotational body 7. Accordingly, mass of the weight portion 42 may be made large without increasing a size in an axial direction while a large centrifugal force may be reliably generated.

An operation of the rotational body 3 in the switching mechanism CM arranged in a configuration described as the first embodiment will be described referring to FIGS. 4 and 5. The rotational body 3 operates in conjunction with a manual operation to rotationally move the door DR, which serves as the rotational member. Note that, hatchings at cross sections of the switching mechanism CM in FIGS. 4 and 5 are omitted for easier understanding of descriptions. At first, during a period during which the rotational body 3 is not operated, as FIG. 4 illustrates, the swinging member 4 is biased by a biasing force of the biasing member 5 so that the swinging member 4 is pushed against and in contact with the shaft portion 1*a*. Accordingly, by a pushing force that applies in a direction indicated with an outline arrow in FIG. 4, the rotational body 3 is retained in a stopped state by frictional engagement. Note that, by forming, for example, narrow grooves or a waved form having protrusions and recesses on surfaces of the inner peripheral surface 4*d* of the lever 41 and the outer peripheral surface of the shaft portion 1*a*, in other words, on the surfaces that come into contact, an initial feeling at a time at which manual operation is initiated may be adjusted.

In a state where the rotational body 3 rotates in conjunction with a manual operation to rotationally move the door DR, which serves as the rotational member, in a direction indicated with an arrow R3 indicating rotation, which is illustrated at an outer peripheral portion of the drawing in FIG. 5, a centrifugal force is generated at the pair of weight portions 42 in response to rotation of the rotational body 3. As a result each of the swinging members 4 swings in a direction indicated with an arrow D4 and detaches from the shaft portion 1*a* against the biasing force of the biasing member 5 by the centrifugal force. Accordingly, a clearance C is formed between the lever 41 and the shaft portion 1*a* and the frictional engagement between the lever 41 and the shaft portion 1*a* is released so that the rotation of the rotational body 3 is allowed. In other words, a state of the switching mechanism CM is switched to the operation allowed state. Note that, when the door DR is manually operated to rotationally move, providing an operational force having a same size as a retaining force initiates rotational movement, however, after the rotational body 3 starts rotating, the centrifugal force is generated at the pair of weight portions 42 in response to the rotational operation of the rotational body 3 and the clearance C is formed between the swinging members 4 and the shaft portion 1*a* so that the door DR, which serves as the rotational member, is operated without difficulty.

Note that, the stopper portions 8 illustrated in FIGS. 2 and 3 may be eliminated and the first embodiment of the switching mechanism CM may be configured such that outer peripheral surface of the weight portion 42 contact with inner peripheral surface of the main body 1 when the centrifugal force is generated at the weight portion 42 by the rotation of the rotational body 3 and the auxiliary rotational body 7. Upon the arrangement described herewith, the swinging member 4 is provided with a frictional brake force so that the swinging of the swinging member 4 is restrained at a predetermined swing angle without having the stopper portion 8. Note that, the swing angle here is an angle the lever 41 swings determined at a time at which the outer peripheral surface of the weight portion 42 makes contact with the inner peripheral surface of the main body 1. Accordingly, without having the stopper portion 8, the rotational body 3 is prevented from excessively rotating.

FIG. 6 illustrates a configuration of a door apparatus of a vehicle provided with the above-described embodiment of the switching mechanism. The door DR is rotationally supported on the door frame DF around a rotational shaft arranged between an upward door hinge, which is a door hinge DH arranged in an upward direction, and a downward door hinge, which is a door hinge DH arranged in a downward direction. Note that, the door DR serves as the rotational member, the door frame DF, which is a vehicle body component, serves as the retaining member. A base end portion of a check bar CB is connected to the door frame DF such that the check bar may make rotational movement relative to the door frame DF. The gear mechanism RD and the switching mechanism CM, which are illustrated in FIG. 1, are housed in a case CS and retained on the door DR. More specifically, the switching mechanism CM internally includes, for example, the rotational body 3 connected to the gear mechanism RD via the connection shaft 2 and the gear G. In the first embodiment of the switching mechanism CM, the case CS is retained on the door DR such that the main body 1 is arranged at a position close to the rotational shaft, which is the shaft arranged between the door hinges DH arranged in the upward direction and in the downward direction. Furthermore, a main body portion of the check bar CB is connected to the gear mechanism RD in the case CS to form a speed increasing apparatus. A rack-and-pinion mechanism where the main body portion of the check bar CB serves as the rack and the gear G as the pinion is an example of the speed increasing apparatus. Furthermore, a planetary gear train, for example, may be arranged between the rack and the pinion.

When the door DR is operated to open, the rotational body 3 and the auxiliary rotational body 7 in the switching mechanism CM are allowed to rotate to allow the check bar CB to move. At this time, the rotational body 3 increases rotational speed via the gear mechanism RD and rotates in high speed. Accordingly, a manual operational force may be immediately decreased immediately after initiating the door opening operation. When an operation to open the door DR is stopped, rotations of the rotational body 3 and the auxiliary rotational body 7 stop. At this time, the rotational body 3 and the auxiliary rotational body 7 are retained in the stopped state by frictional engagement. Accordingly, the check bar CB is restrained from moving so that the door DR is reliably retained at a selected stopped position with an appropriate retaining force. When the door DR is operated to close, the rotations of the rotational body 3 and the auxiliary rotational body 7 in the switching mechanism CM are allowed. The rotational body 3 rotates via the gear mechanism RD. During the period during which the door DR is operated to close, the rotations of the rotational body 3 and the auxiliary rotational body 7 in the switching mechanism CM accumulates a kinetic energy that applies torque to other mechanical elements, which is a phenomenon known as a flywheel effect. Accordingly, even the door DR having a lightweight operates similarly to a heavy door when the door DR is operated to close so that the door DR may be reliably closed without difficulty. In other words, although the door DR is closed slowly, or in low speed, the door DR may push through a striker completely so that the door DR may be properly closed without remaining in a half-latched position.

Figure 7:
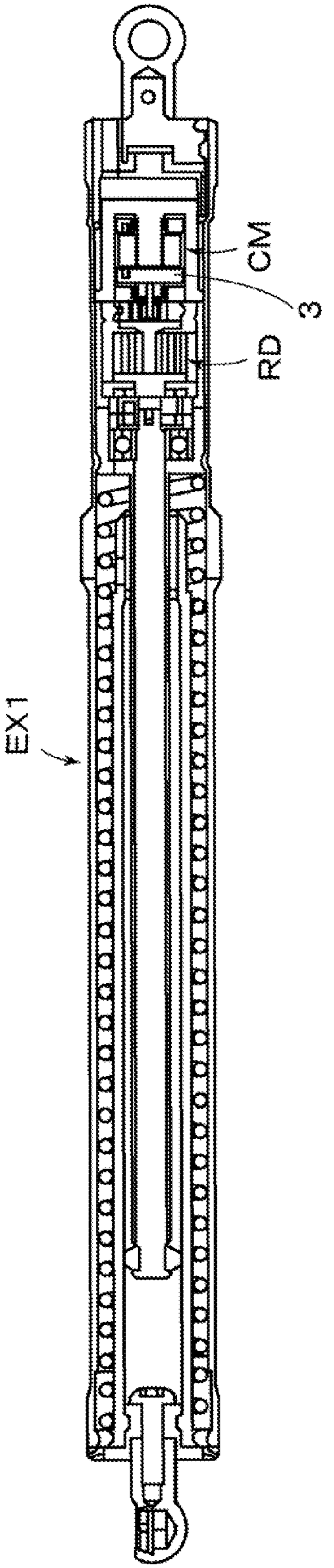
FIG. 7 is a cross-sectional view drawing of a telescopic drive mechanism for a back door of a vehicle installed with the first embodiment of the switching mechanism.

The switching mechanism CM illustrated in FIGS. 1 through 3 may be installed inside a telescopic drive mechanism EX1 for a back door of a vehicle at a position indicated with reference alphabets CM in FIG. 7. The telescopic drive mechanism EX1 is arranged between the back door of a vehicle and a vehicle body. The switching mechanism CM serves to switch the state of the telescopic drive mechanism EX1 between the operation allowed state and the movement restrained state. The operation allowed state is the state in which an operation of the back door is allowed in response to manual operation of the rotational body 3 and the auxiliary rotational body 7 to rotate the rotational body 3 and the auxiliary rotational body 7. The movement restrained state is the state in which the back door is retained at a selected stopped position. The rotational body 3 is connected to the gear mechanism RD via the connection shaft 2 and the gear G. The gear mechanism is arranged at a position indicated with reference alphabets RD in FIGS. 1 and 7. In a state where the rotational body 3 rotates in conjunction with an operation to manually open the back door, the rotational body 3 rotates in high speed because the input from manual operation is increased in rotational speed via the gear mechanism RD. Accordingly, the manual operational force is immediately decreased immediately after the operation to open the back door is initiated.

According to the first embodiment of the switching mechanism CM, without an electrical control of the switching mechanism CM, the frictional engagement between the swinging member 4 and the shaft portion 1*a* is automatically released to provide a rotation allowed state in response to the rotations of the rotational body 3 and the auxiliary rotational body 7 in conjunction with the manual operation to open the back door, which serves as the rotational member, so that the back door is opened. Furthermore, when the operation to open the back door is stopped and the rotations of the rotational body 3 and the auxiliary rotational body 7 stop, the rotational body 3 is retained in the stopped state by frictional engagement between the swinging member 4 and the shaft portion 1*a*. Accordingly, the back door is reliably retained at a selected stopped position with the appropriate retaining force.

Figure 8:
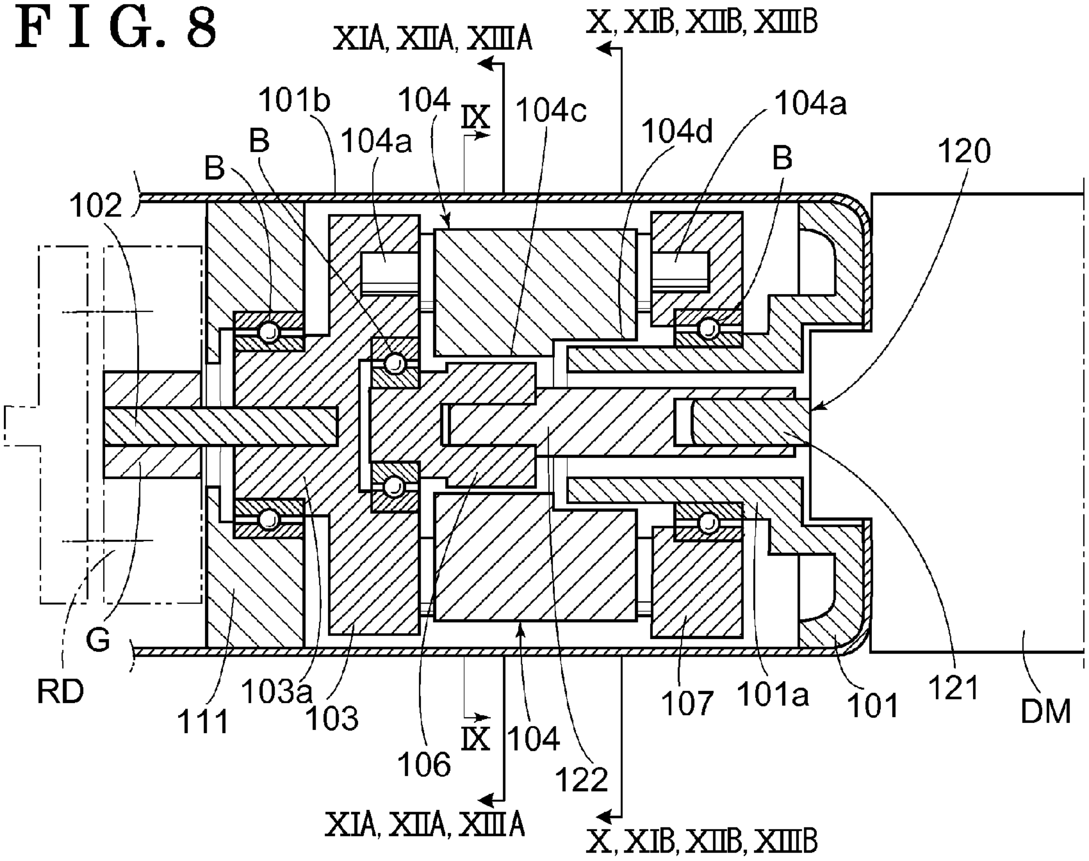
FIG. 8 is a cross-sectional view drawing taken in an upward-downward direction illustrating a second embodiment of the switching mechanism.
Figure 9:
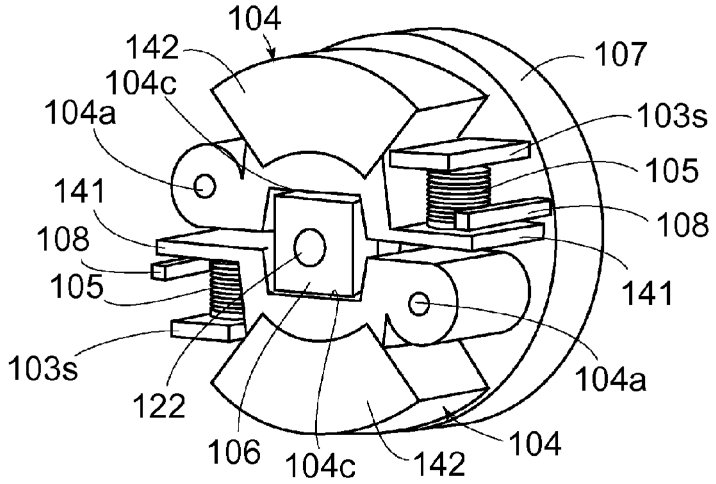
FIG. 9 is a perspective view drawing illustrating a cross section of the second embodiment of the switching mechanism taken along line IX-IX in FIG. 8.
Figure 10:
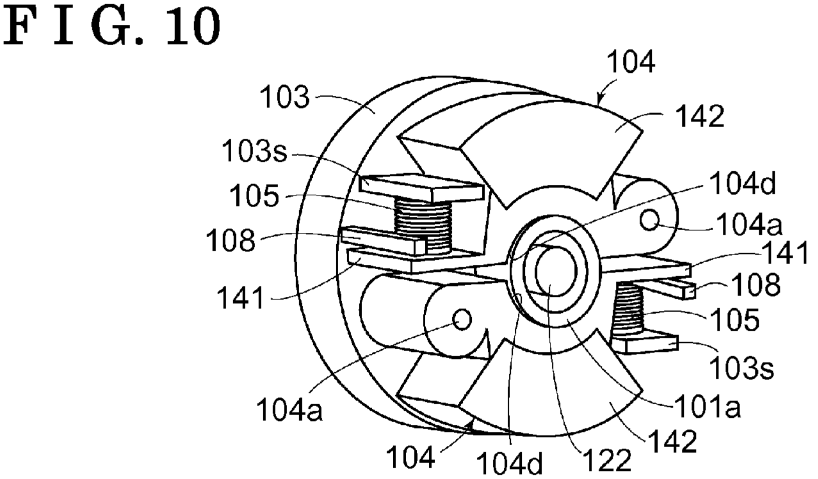
FIG. 10 is a perspective view drawing illustrating a cross section of the second embodiment of the switching mechanism taken along line X-X in FIG. 8.

FIGS. 8 to 17 illustrate the second embodiment of the switching mechanism TM. In addition to providing the operation allowed state in which the rotational member is allowed to operate, the switching mechanism TM according to the second embodiment may serve as a switching mechanism that allows the state of the switching mechanism TM to be switched to a drive power transmitting state in which a drive power is transmitted to the rotational member and to the movement restraining state in which the rotational member is retained at a selected stopped position. For example, in FIG. 17, the switching mechanism TM is installed in a telescopic drive mechanism EX2 for a power back door of a vehicle at a position indicated with reference numerals TM and switches the state of the telescopic drive mechanism EX2 between the state in which the drive power is transmitted to open or close the back door and the state in which the back door is retained in a stopped state. The operation in detail will be described later. FIGS. 8 through 10 shows basic configuration of the second embodiment of the switching mechanism TM. The components that correspond to the components of the switching mechanism CM according to the first embodiment in FIGS. 1 through 3 are provided with reference numerals having a number added with 100 to the reference numerals in FIGS. 1 through 3. Furthermore, components unique to the second embodiment of the switching mechanism TM are provided with a reference numeral in 100th. As FIG. 8 illustrates, a main body 101 includes a shaft portion 101*a* formed in a hollow cylinder form. A driving motor DM is fixed to the main body 101 such that an output shaft 120 penetrates through the shaft portion 101*a*. A rotational body 103 is arranged at an end portion of the driving motor DM. The rotational body 103 is in a rotatably supported state and rotates independently from the main body 101 with the shaft portion 101*a* as the center of rotation. As FIG. 8 illustrates, in the switching mechanism TM according to the second embodiment, an output shaft 121 of the driving motor DM connects to a connection shaft 122 so that the output shaft 121 of the driving motor DM and the connection shaft 122 integrally rotate. The output shaft 121 of the driving motor DM and the connection shaft 122 together forms the output shaft 120.

A swinging member 104 is swingably supported on the rotational body 103. The swinging member 4 is arranged to make contact with and detach from the shaft portion 101*a* in response to swinging of the swinging member 104. The swinging member 104 includes a lever 141 with one end being rotatably supported and a weight portion 142 arranged on a portion of the lever 141, the portion distantly positioned relative to the shaft portion 101*a*. In the switching mechanism TM according to the second embodiment, a pair of swinging members 104 are symmetrically arranged relative to central axis point of the shaft portion 101*a* with one end of each of a pair of levers 141 being rotatably supported. The swinging members 104 further include a pair of weight portions 142 where each of the pair of weight portions 142 is arranged on a portion of each of the pair of levers 141, the portion distantly positioned relative to the shaft portion 101*a*. Nevertheless, the swinging member 104 may be arranged singularly and not as a pair. Note that, the lever 141 and the weight portion 142 may be formed integrally or may be formed separately and joined afterwards.

As FIGS. 9 and 10 illustrate, a biasing member 105 is retained between a retaining portion 103*s* arranged on the rotational body 3 and the lever 141 of the swinging member 104 so that the swinging member 104 is biased toward central axis of the shaft portion 101*a*. In the switching mechanism TM according to the second embodiment, the biasing member 105 is a pair of coil springs where each of the coil springs is arranged at a position close to a free end portion of each of the pair of levers 141. Furthermore, as FIG. 8 through 10 illustrates, on the output shaft 120 at a small diameter portion of the connection shaft 122, a cam member 106 having a square shape in the frontal view is connected. The cam member 106 is arranged at a position close to a cam surface 104*c* that is formed to recede into the lever 141 of the swinging member 104 in a trapezoidal shape with a small clearance between the cam surface 104*c*. Furthermore, the cam member 106 is arranged to make contact with and detach from the cam surface 104*c*. In addition, an inner peripheral surface 104*d*, which is formed to have a semicircular shape in the frontal view, is arranged to make contact with and detach from outer peripheral surface of the shaft portion 101*a* in response to the swinging of the lever 141 of the swinging member 104.

In the switching mechanism TM according to the second embodiment, an auxiliary rotational body 107 is rotatably supported on the shaft portion 101*a* with the shaft portion 101*a* as the center of rotation. Accordingly, the lever 141 and the weight portion 142 are arranged between the rotational body 103 and the auxiliary rotational body 107. Furthermore, one end of a swinging shaft 104*a* for the lever 141 is supported on the auxiliary rotational body 107 and the other end of the swinging shaft 104*a* for the lever 141 is supported on the rotational body 103. In other words, the lever 141 is retained by each end of the swinging shaft 104*a* being retained, however, the switching mechanism TM may be configured without the auxiliary rotational body 107 and the lever 141 may be retained by one end of the swinging shaft 104*a* alone at the rotational body 103 on condition that an adequate rigidity may be provided to retain the lever 141. Furthermore, the retaining portion 103*s* is retained at each end by the rotational body 103 and the auxiliary rotational body 107. Nevertheless, the retaining portion 103*s* may be in a configuration where the retaining portion 103*s* is retained at one end alone. In addition, the switching mechanism TM according to the second embodiment includes a stopper portion 108 restraining swinging of the swinging member 104 at a predetermined swing angle. As FIGS. 9 and 10 illustrate, the stopper portion 108, which is a separate component formed in a stick form, is arranged between the rotational body 103 and the auxiliary rotational body 107. Nevertheless, the stopper portion 108 may be integrally formed by extrusion with the rotational body 103 or the auxiliary rotational body 107.

In the switching mechanism TM according to the second embodiment, as FIG. 8 illustrates, a tubular member 101*b* is sandwiched between the main body 101 and the driving motor DM. The switching mechanism TM according to the second embodiment is configured in a housing form by a supporting member 111 fitted to an opening portion of the tubular member 101*b*. As an alternative, the tubular member 101*b* and the main body 101 may be integrally formed and by the supporting member 111 fitted to an opening portion of the main body 101, the housing form may be formed. In FIG. 8, bearings are indicated with a reference alphabet B. The rotational body 103 is rotatably supported on the supporting member 111 via a bearing B. The auxiliary rotational body 107 is rotatably supported on the shaft portion 101*a* via another bearing B. Note that, the cam member 106 is rotatably supported on the rotational body 103 via a third bearing B, however, this bearing B, which is between the rotational body 103 and the cam member 106, may be removed.

Figure 11A:
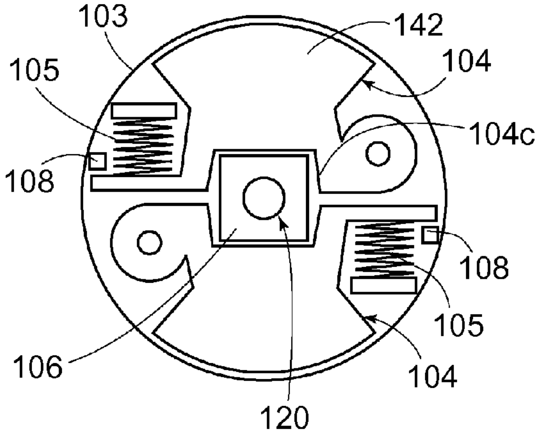
FIG. 11A is a cross-sectional view drawing taken along line XIA-XIA in FIG. 8 illustrating the second embodiment of the switching mechanism with a rotational body in a stopped state.
Figure 11B:
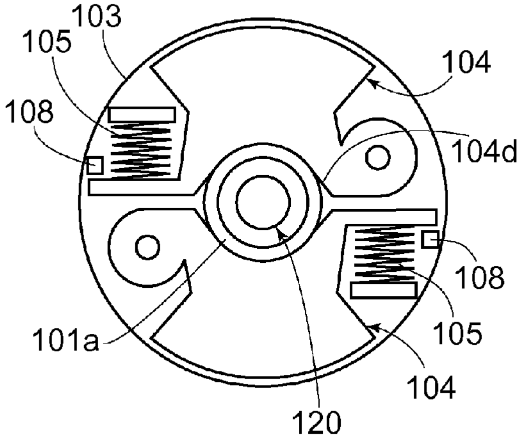
FIG. 11B is a cross-sectional view drawing taken along line XIB-XIB in FIG. 8 illustrating the second embodiment of the switching mechanism with the rotational body in the stopped state.
Figure 12A:
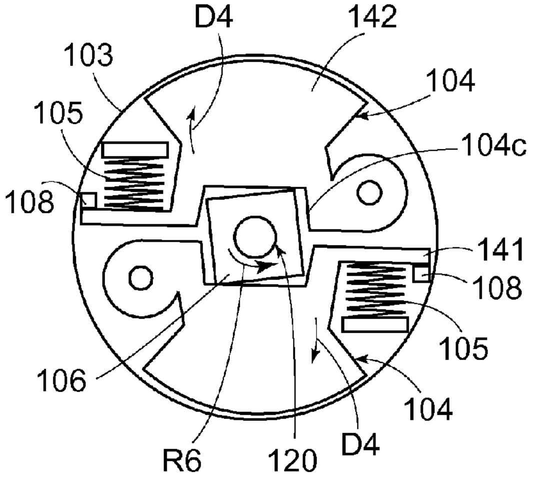
FIG. 12A is a cross-sectional view drawing taken along line XIIA-XIIA in FIG. 8 illustrating the second embodiment of the switching mechanism in a state where a driving motor is driven.
Figure 12B:
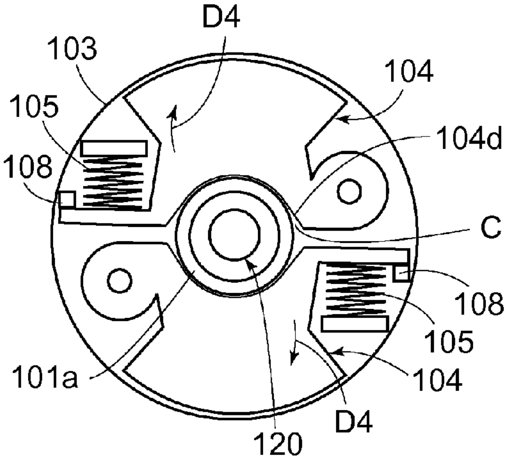
FIG. 12B is a cross-sectional view drawing taken along line XIIB-XIIB in FIG. 8 illustrating the second embodiment of the switching mechanism in a state where the driving motor is driven.
Figure 13A:
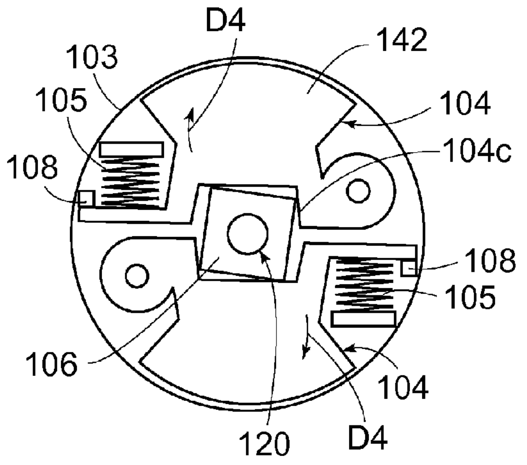
FIG. 13A is a cross-sectional view drawing taken along line XIIIA-XIIIA in FIG. 8 illustrating the second embodiment of the switching mechanism in a state where the switching mechanism is manually operated.
Figure 13B:
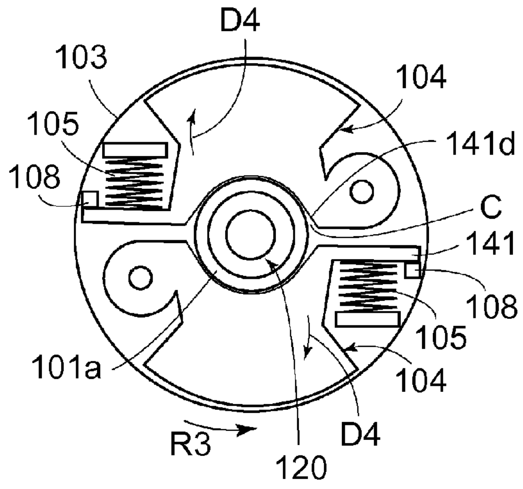
FIG. 13B is a cross-sectional view drawing taken along line XIIIB-XIIIB in FIG. 8 illustrating the second embodiment of the switching mechanism in a state where the switching mechanism is manually operated.

An operation of the rotational body 103 in the switching mechanism TM arranged in a configuration described as the second embodiment will be described referring to FIGS. 11A through 13B. The rotational body 103 operates driven by the driving motor DM or by a manual operation of the rotational member. FIGS. 11A, 12A, and 13A are cross sectional view drawings taken along line XIA-XIA, XIIA-XIIA, and XIIIA-XIIIA, respectively, in FIG. 8. Viewing direction of the cross sectional view drawings taken along line XIA-XIA, XIIA-XIIA, and XIIIA-XIIIA is in the opposite direction relative to the viewing direction of the drawings taken along line IX-IX. FIGS. 11B, 12B, and 13B are cross sectional view drawings taken along line XIB-XIB, XIIB-XIIB, and XIIIB-XIIIB, respectively, in FIG. 8. Hatchings at cross sections of the switching mechanism TM in FIGS. 11A through 13B are omitted. At first, during a period during which the driving motor DM is not driven, as FIG. 11B illustrates, the swinging member 104 is pushed against and in contact with the shaft portion 101*a* by a biasing force of the biasing member 105. Accordingly, the rotational body 103 is retained at the stopped state by frictional engagement of the swinging member 104 and the shaft portion 101*a*.

During a period during which the driving motor DM is driven, when the output shaft 120 or more specifically the small diameter portion of the connection shaft 122, which is illustrated in FIG. 8, is driven to rotate in a direction indicated with an arrow R6 indicating rotation, which is illustrated at a central portion of the drawing in FIG. 12A, the cam member 106 pushes the swinging member 104 in a direction that makes the swinging member 104 detach from the shaft portion 101*a*, which is the direction indicated with an arrow D4. Accordingly, as FIG. 12B illustrates, each of the pair of levers 141 moves in a direction that makes the lever 141 detach from the shaft portion 101*a* against the biasing force of each of a pair of biasing members 105. Accordingly a clearance C is formed between the lever 141 and the shaft portion 101*a*. In other words, the frictional engagement between the lever 141 and the shaft portion 101*a* is released and a force to retain the rotational body 103 in a still state is lost. As a result, the cam member 106, the swinging member 104 and the rotational body 103 integrally rotate in response to the rotation of the output shaft 120.

During the period during which the driving motor DM is not driven, in a state where the rotational body 103 rotates in response to a manual operation of a rotational member in a direction indicated with an arrow R3 indicating rotation, which is illustrated at an outer peripheral portion of the drawing in FIG. 13B, a centrifugal force is generated at the pair of weight portions 142 in response to rotation of the rotational body 103 so that the swinging member 104 swings in a direction indicated with an arrow D4 and detaches from the shaft portion 101*a*. Accordingly, a clearance C is formed between the lever 141 and the shaft portion 101*a* and the frictional engagement between the lever 141 and the shaft portion 101*a* is released so that the rotational body 103 rotates. Note that, when the rotational member is manually operated to rotationally move, providing an operational force having a same size as a retaining force initiates rotational movement, however, after the rotational body 103 starts rotating, the centrifugal force is generated at the pair of weight portions 142 in response to the rotational operation of the rotational body 103 and the clearance C is formed between the swinging members 104 and the shaft portion 101*a* so that the rotational body 103 is rotated with a small operational force without difficulty. Furthermore, while the rotational member is manually operated to rotationally move, the output shaft 120 of the driving motor DM, which is not driven, rotates along with the rotation of the rotational body 103 via the cam member 106 as FIG. 13A illustrates. Nevertheless, this rotation of the output shaft 120 is a free rotation and does not generate a reaction force to an amount affecting the manual operational force.

Note that, the stopper portions 108 illustrated in FIGS. 9 and 10 may be eliminated and the switching mechanism TM according to the second embodiment may be configured such that outer peripheral surface of the weight portion 142 contact with inner peripheral surface of the tubular member 101*b*, or the main body 101 integrated with the tubular member 101*b*, when the centrifugal force is generated at the weight portion 142 by the rotation of the rotational body 103 and the auxiliary rotational body 107. Upon the arrangement described herewith, the swinging member 104 is provided with a frictional brake force so that the swinging of the swinging member 104 is restrained at a predetermined swing angle without having the stopper portion 108. Note that, the swing angle here is an angle the lever 141 swings determined at a time at which the outer peripheral surface of the weight portion 142 makes contact with the inner peripheral surface of the tubular member 101*b*. Accordingly, without having the stopper portion 108, the rotational body 103 is prevented from excessively rotating.

Figure 17:
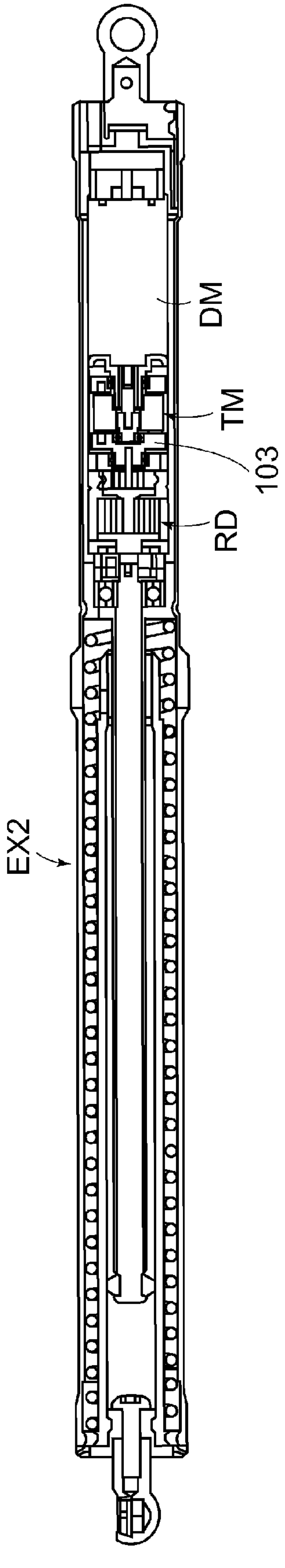
FIG. 17 is a cross-sectional view drawing of a telescopic drive mechanism for a power back door of a vehicle installed with the second embodiment of the switching mechanism.

The switching mechanism TM illustrated in FIGS. 8 through 10 may be installed inside a telescopic drive mechanism EX2 for a power back door of a vehicle at a position indicated with reference alphabets TM in FIG. 17. The telescopic drive mechanism EX2 is arranged between a back door of a vehicle, which serves as a rotational member, and a vehicle body, which serves as a retaining member. The telescopic drive mechanism EX2 expands and contracts in an elongating direction of the telescopic drive mechanism EX2 in response to the rotation of the rotational body 103 driven by a driving motor DM or by manual operation to open and close the back door. The rotational body 103 of the switching mechanism TM according to the second embodiment is connected to the gear mechanism RD via a connection shaft 102 connected to a shaft portion 103*a* of the rotational body 103 and via the gear G, as illustrated in FIG. 8. The gear mechanism RD is arranged at a position indicated with reference alphabets RD in FIGS. 8 and 17. During a period during which the driving motor DM is driven, in a state where the rotational body 103 rotates via the cam member 106 in response to the rotation of the output shaft 120, the rotational output of the driving motor DM is reduced in speed via the gear mechanism RD. Accordingly, during a period during which the driving motor DM is not driven, in a state where the rotational body 103 rotates in response to the manual operation of the back door, the rotational body 103 rotates in high speed because the input by the manual operation increases rotational speed via the gear mechanism RD. Accordingly, the manual operational force is immediately decreased immediately after the operation to rotate the rotational body 103 is initiated.

Accordingly, the switching mechanism TM according to the second embodiment may open and close the back door by automatically releasing the frictional engagement at the shaft portion 101*a* of the main body 101 in response to the rotation of the rotational body 103 driven by a driving motor DM that is small in size or by manual operation without an electromagnetic clutch or an electrical control for the electromagnetic clutch. Furthermore, when the rotation of the rotational body 103 is stopped, the rotational body 103 may be reliably retained in a stopped state by frictional engagement so that the back door may be reliably retained at a selected stopped position with an appropriate retaining force that retains the back door. Note that, by forming, for example, narrow grooves or a waved form having protrusions and recesses on surfaces of the inner peripheral surface 104*d* of the lever 141 and the outer peripheral surface of the shaft portion 101*a*, in other words, on the surfaces that come into contact, an initial feeling at a time at which manual operation is initiated may be adjusted.

Figure 14:
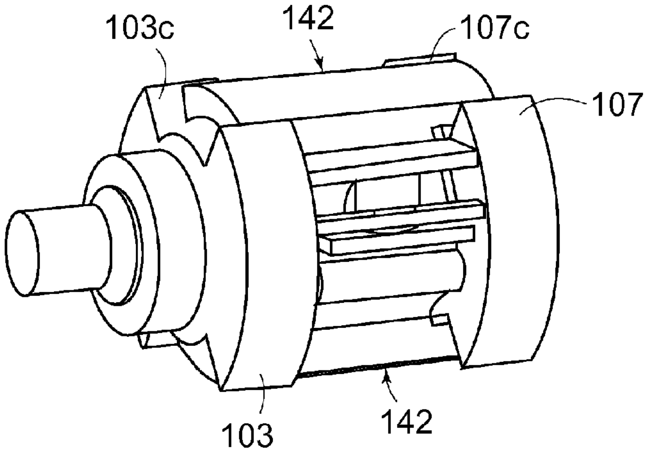
FIG. 14 is a perspective view drawing illustrating a third embodiment of the switching mechanism.
Figure 15:
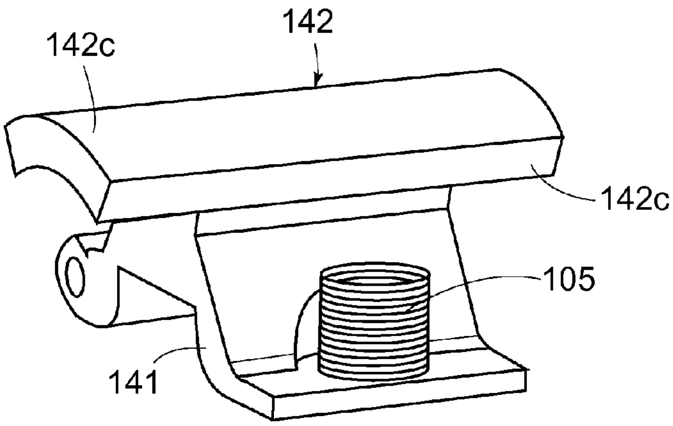
FIG. 15 is a perspective view drawing illustrating a swinging member of the third embodiment of the switching mechanism.
Figure 16:
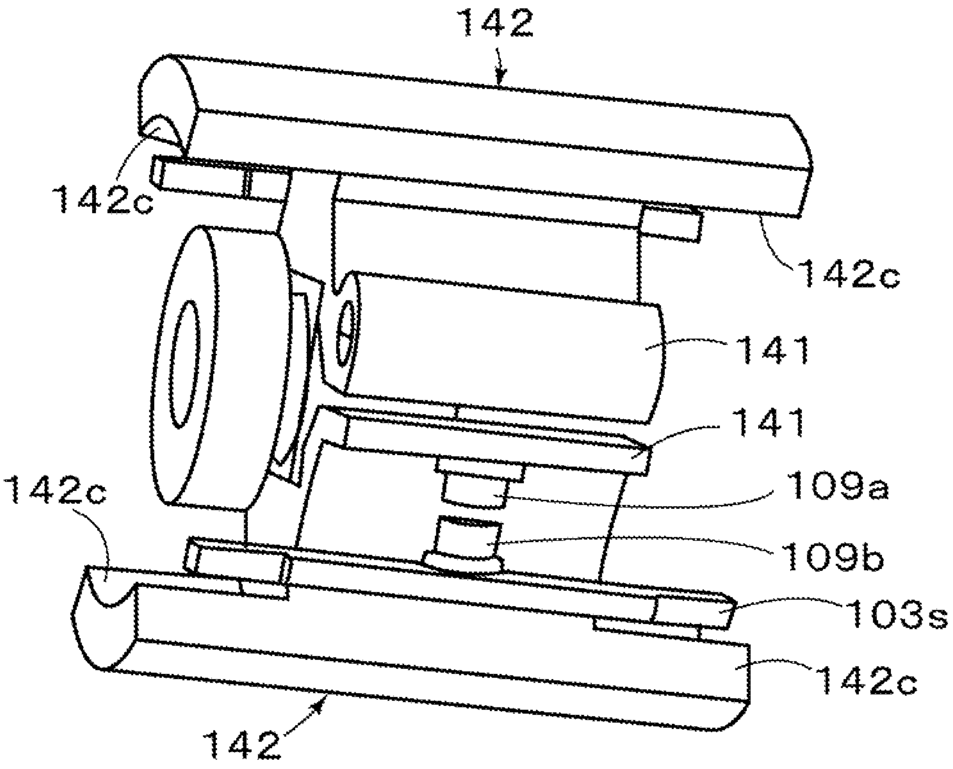
FIG. 16 is a perspective view drawing illustrating a stopper portion of the third embodiment of the switching mechanism.

FIGS. 14 through 16 illustrate the switching mechanism TM according to a third embodiment. Substantially same components between the third embodiment of the switching mechanism TM illustrated in FIGS. 14 through 16 and the second embodiment of the switching mechanism TM illustrated in FIGS. 8 through 13 are provided with same reference numerals and alphabets. The rotational body 103 and the auxiliary rotational body 107 of the switching mechanism TM according to the third embodiment is provided with a cut out portion 103*c* and a cut out portion 107*c*, respectively. The cut out portion 103*c* is formed by removing a portion from the outer peripheral surface of the rotational body 103 and the cut out portion 107*c* is formed by removing a portion from the outer peripheral surface of the auxiliary rotational body 107. The weight portion 142 is formed with extending portions 142*c*. The extending portions 142*c* extend into the cut out portion 103*c* and the cut out portion 107*c*. Accordingly, mass of the weight portion 142 may be made large without increasing the size in an axial direction while a large centrifugal force may be reliably generated. Note that, the lever 141 and the weight portion 142 in FIG. 15 are integrally formed, however, the lever 141 and the weight portion 142 may be separately formed and joined afterwards.

Furthermore, as FIG. 16 illustrates, the switching mechanism TM according to the third embodiment includes a first spring seat portion 109*a* formed in a form having a protruding shape cross section arranged on the lever 141 at a position close to the free end portion of the lever 141 and a second spring seat portion 109*b* having substantially same form as the first spring seat portion 109*a* retained on the retaining portion 103*s* at a position facing the first spring seat portion 109*a*. An end surface of the first spring seat portion 109*a* and an end surface of the second spring seat portion 109*b* are arranged to face each other. A coil spring of the biasing member 105 is retained between the first spring seat portion 109*a* and the second spring seat portion 109*b*. Swinging of the lever 141 is restrained when the end surface of the first spring seat portion 109*a* and the end surface of the second spring seat portion 109*b* come into contact with each other. Accordingly, the stopper portion 108, which is illustrated in FIGS. 9 and 10 may be eliminated so that the configuration of the switching mechanism TM becomes less complicated. Note that, the configuration illustrated in FIG. 16 may be applied to the switching mechanism CM according to the first embodiment, which is illustrated in FIGS. 1 through 3. Furthermore, the switching mechanism TM according to the third embodiment may be applied, for example, to a power sliding door of a vehicle and an automatic door for a residence.

According an aspect of this disclosure, a switching mechanism CM, TM to be arranged between a retaining member (a door frame DF) and a rotational member (a door DR) configured to make rotational movement relative to the retaining member (the door frame DF), the switching mechanism CM, TM switching a state between an operation allowed state where movement of the rotational member (the door DR) is allowed and a movement restrained state where the rotational member (the door DR) is retained at a selected stopped position includes a main body 1, 101 including a shaft portion 1*a*, 101*a* and attaching to the retaining member (the door frame DF), a rotational body 3, 103 in a rotatably supported state and connecting to the rotational member (the door DR), the rotational body 3, 103 rotating independently from the main body 1, 101 with the shaft portion 1*a*, 101*a* as center of rotation, a swinging member 4, 104 swingably supported on the rotational body 3, 103, the swinging member 4, 104 making contact with and detaching from the shaft portion 1*a*, 101*a* in response to swinging movement of the swinging member 4, 104, and a biasing member 5, 105 retained on the rotational body 3, 103, the biasing member 5, 105 biasing the swinging member 4, 104 toward central axis of the shaft portion 1*a*, 101*a*. The swinging member 4, 104 detaches from the shaft portion 1*a*, 101*a* against a biasing force of the biasing member 5,105 by a centrifugal force generated at the swinging member 4, 104 in response to rotation of the rotational body 3, 103 rotating in conjunction with movement of the rotational member (the door DR) to switch the state of the switching mechanism CM, TM to the operation allowed state in a state where the rotational member (the door DR) is operated to rotationally move. The biasing force of the biasing member 5,105 pushes the swinging member 4, 104 to make contact with the shaft portion 1*a*, 101*a* and engages with the shaft portion 1*a*, 101*a* by friction to retain the rotational body 3, 103 in a stopped state to switch the state of the switching mechanism CM, TM to the movement restrained state in a state where the rotational member (the door DR) is stopped from making rotational movement.

Accordingly, the switching mechanism CM, TM is smoothly switched between the operation allowed state and the movement restrained state as a result of manual operation of the rotational member (the door DR). Furthermore, a state of the rotational body 3, 103 is reliably retained in a stopped state by an engagement by friction when the rotational body 3, 103 comes to a stop. Accordingly, a switching mechanism providing a large door retaining force that is favorable, for example, for a door apparatus for a vehicle may be provided.

According to another aspect of this disclosure the swinging member 4, 104 of the switching mechanism CM, TM includes a lever 41, 141 with one end being rotatably supported and an weight portion 42, 142 arranged on a portion of the lever 41, 141, the portion distantly positioned relative to the shaft portion 1*a*, 101*a*. The biasing member 5,105 includes a spring arranged at a position close to a free end portion of the lever 41, 141. The lever 41, 141 swings in a direction that makes the lever 41, 141 move away from the shaft portion 1*a*, 101*a* against the biasing force of the spring by the centrifugal force generated at the weight portion 42, 142 in response to the rotation of the rotational body 3, 103.

Upon the arrangement described herewith, the switching mechanism CM, TM greatly reducing an operational force at a time of manual operation may be provided with a simple configuration.

According to further aspect of this disclosure, the swinging member 4, 104 of the switching mechanism CM, TM includes a pair of levers 41, 141 symmetrically arranged relative to central axis point of the shaft portion 1*a*, 101*a* with one end of each of the pair of the levers 41, 141 being rotatably supported. The swinging member 4, 104 includes a pair of weight portions 42, 142 where each of the pair of weight portions 42, 142 is arranged on a portion of each of the pair of levers 41, 141, the portion distantly positioned relative to the shaft portion 1*a*, 101*a*. The biasing member 5,105 is configured with a pair of springs where each of the pair of springs is arranged at a position close to a free end portion of each of the pair of the levers 41, 141. Each of the pair of levers 41, 141 swings in a direction that makes each of the pair of levers 41, 141 move away from the shaft portion 1*a*, 101*a* against the biasing force of each of the pair of springs by the centrifugal force generated at each of the pair of the weight portions 42, 142 in response to the rotation of the rotational body 3, 103.

Upon the arrangement described herewith, the switching mechanism CM, TM greatly reducing an operational force at a time of manual operation may be provided with a simple configuration.

According to another aspect of this disclosure, the switching mechanism CM, TM further includes an auxiliary rotational body 7, 107 rotatably supported on the shaft portion 1*a*, 101*a* rotating at the shaft portion 1*a*, 101*a* as the center of rotation. The lever 41, 141 and the weight portion 42, 142 of the switching mechanism CM, TM are arranged between the auxiliary rotational body 7, 107 and the rotational body 3, 103. One end of a swinging shaft 4*a*, 104*a* for the lever 41, 141 is supported on the auxiliary rotational body 7, 107 and the other end of the swinging shaft 4*a*, 104*a* for the lever 41, 141 is supported on the rotational body 3, 103.

Upon the arrangement described herewith, the lever 41, 141 may be reliably and stably retained by being supported at each side.

According to further aspect of this disclosure, each of the auxiliary rotational body 7, 107 and the rotational body 3, 103 of the switching mechanism CM, TM includes a cut out portion 3*c*, 7*c*, 103*c*, 107*c* formed by removing a portion from an outer peripheral surface of each of the auxiliary rotational body 7, 107 and the rotational body 3, 103. The weight portion 42, 142 includes an extending portion 42*c*, 142*c* extending into the cut out portion 3*c*, 7*c*, 103*c*, 107*c* of each of the auxiliary rotational body 7, 107 and the rotational body 3, 103.

Upon the arrangement described herewith, the weight portion 42, 142 is formed in a large size without increasing the switching mechanism CM, TM in size so that an appropriate size of the centrifugal force may be reliably provided without making the switching mechanism CM, TM large.

According to another aspect of this disclosure, the switching mechanism CM, TM further includes a stopper portion 8, 108 restraining swinging of the swinging member 4, 104 at a predetermined swing angle.

Upon the arrangement described herewith, swinging of the swinging member 4, 104 is reliably restrained from swinging over the predetermined swing angle so that a reliable and stable operation of the swinging member 4, 104 may be provided.

According to further aspect of this disclosure, the switching mechanism CM, TM a further includes a gear mechanism RD arranged between the rotational body 3, 103 and the rotational member (the door DR) to connect the rotational body 3, 103 and the rotational member (the door DR). The rotational body 3, 103 increases rotational speed via the gear mechanism RD in a state where the rotational member (the door DR) is manually operated to rotationally move.

By a configuration where the gear mechanism RD connects to the rotational body 3, 103, particularly at a time at which the rotational body 3, 103 rotates in response to manually operating the rotational member (the door DR) to make rotational movement, a manual operational force may be reduced immediately after the rotational movement is initiated because the gear mechanism RD increases rotational speed of an input from the manual operation. Accordingly, a switching mechanism CM, TM favorable for a door apparatus of a vehicle may be provided.

According to another aspect of this disclosure, a switching mechanism TM to be arranged between a retaining member (a door frame DF) and a rotational member (a door DR) configured to make rotational movement relative to the retaining member (the door frame DF), the switching mechanism TM switching a state between an operation allowed state where movement of the rotational member (the door DR) is allowed and a movement restrained state where the rotational member (the door DR) is retained at a selected stopped position includes a main body 101 including a shaft portion 101*a* formed in a hollow cylinder form and attaching to the retaining member (the door frame DF), a driving motor DM including an output shaft 120 inserted through the shaft portion 101*a*, the driving motor DM to be fixed to the main body 101, a rotational body 103 in a rotatably supported state and connecting to the rotational member (the door DR), the rotational body 103 rotating independently from the main body 101 with the shaft portion 101*a* as the center of rotation, a swinging member 104 swingably supported on the rotational body 103, the swinging member 104 making contact with and detaching from the shaft portion 101*a* in response to swinging movement of the swinging member 104, a biasing member 105 retained on the rotational body 103, the biasing member 105 biasing the swinging member 104 toward central axis of the shaft portion 101*a*, and a cam member 106 connected to the output shaft 120, the cam member 106 pushing the swinging member 104 in a direction that makes the swinging member 104 move away from the output shaft 120 against the biasing force of biasing member 105 in response to rotation of the output shaft 120. The biasing force of the biasing member 105 pushes the swinging member 104 to make contact with the shaft portion 101*a* and engages with the shaft portion 101*a* by friction to retain the rotational body 103 in a stopped state in a state where the driving motor DM is not driven. The swinging member 104 detaches from the shaft portion 101*a* in response to the rotation of the output shaft 120 via the cam member 106 to switch the state of the switching mechanism TM to the operation allowed state in a state where the driving motor DM is driven. The swinging member 104 detaches from the shaft portion 101*a* against the biasing force of the biasing member 105 by a centrifugal force generated at the swinging member 104 in response to rotation of the rotational body 103 rotating in conjunction with movement of the rotational member (the door DR) to switch the state of the switching mechanism TM to the operation allowed state in a state where the driving motor DM is not driven and the rotational member (the door DR) is manually operated to rotationally move.

The arrangement described herewith is different from a clutch mechanism. In other words, the switching mechanism TM is a mechanism including the main body 101 where the driving motor DM is fixed to and a rotational body 103 rotatably supported on the output shaft 120 of the driving motor DM and rotating independently from the main body 101. The mechanism of the switching mechanism TM works between the main body 101 and the rotational body 103 such that the rotational body 103 engages with the main body 101 by friction to retain the rotational body 103 in the stopped state. Furthermore, the mechanism is configured such that the rotational body 103 disengages with the main body 101 by releasing frictional engagement between the rotational body 103 and the main body 101 at a time at which the rotational body 103 is rotated driven by the driving motor DM or by manually. Accordingly, the state of the switching mechanism TM is switched between a state in which a driving force is transmitted to the rotational body 103 and a state in which the rotational body 103 is retained in the stopped state. Upon the arrangement described herewith, the switching mechanism TM may provide the operation allowed state, which is the state in which the driving force is transmitted, mechanically and without an electrical control in response to rotation of the rotational body 103 driven by the driving motor DM or in response to rotation of the rotational body 103 by a manual operation exerting a force that temporarily exceeding the retaining force to release the frictional engagement between the rotational body 103 and the main body 101. Furthermore, the switching mechanism TM may mechanically and without an electrical control switch to the state in which the rotational body 103 is retained in the stopped state by frictional engagement at a time at which movement of the rotational body 103 is stopped. Accordingly, a switching mechanism TM providing a large door retaining force may be provided, which is favorable, for example, for a power back door and a power sliding door of a vehicle.

According to further aspect of this disclosure, the switching mechanism TM further includes a first spring seat portion 109*a* formed in a form having a protruding shape cross section arranged on the lever 141 at a position close to the free end portion of the lever 141 and a second spring seat portion 109*b* having same form as the first spring seat portion 109*a* retained at a position facing the first spring seat portion 109*a*. An end surface of the first spring seat portion 109*a* and an end surface of the second spring seat portion 109*b* are arranged to face each other. The spring is retained between the first spring seat portion 109*a* and the second spring seat portion 109*b*. Swinging of the lever 141 is restrained when the end surface of the first spring seat portion 109*a* and the end surface of the second spring seat portion 109*b* come into contact with each other.

Upon the arrangement described herewith, swinging of the swinging member 104 is reliably restrained from swinging over the predetermined swing angle so that a reliable and stable operation of the swinging member 104 may be provided without providing a separate stopper portion 108.

According to another aspect of this disclosure, the switching mechanism TM further includes a gear mechanism RD arranged between the rotational body 103 and the rotational member (the door DR) to connect the rotational body 103 and the rotational member (the door DR). A rotational output of the driving motor DM decreases rotational speed via the gear mechanism RD in a state where the driving motor DM is driven and the rotational body 103 rotates in response to the rotation of the output shaft 120 via the cam member 106. The rotational body 103 increases rotational speed via the gear mechanism RD in a state where the rotational member (the door DR) is manually operated to rotationally move in a state where the driving motor DM is not driven.

By a configuration where the gear mechanism RD connects to the rotational body 103, particularly at a time at which the rotational body 103 rotates in response to manually operating the rotational member DR during a period during which the driving motor DM is not driven, a manual operational force may be reduced immediately after the rotational movement is initiated because the gear mechanism RD increases rotational speed of an input from the manual operation. Accordingly, a switching mechanism TM favorable, for example, for a power back door and a power sliding door of a vehicle may be provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A switching mechanism to be arranged between a retaining member and a rotational member configured to make rotational movement relative to the retaining member, the switching mechanism switching a state between an operation allowed state where movement of the rotational member is allowed and a movement restrained state where the rotational member is retained at a selected stopped position, comprising:

a main body including a shaft portion and attaching to the retaining member;

a rotational body in a rotatably supported state and connecting to the rotational member, the rotational body rotating independently from the main body with the shaft portion as center of rotation;

a swinging member swingably supported on the rotational body, the swinging member making contact with and detaching from the shaft portion in response to swinging movement of the swinging member; and a biasing member retained on the rotational body, the biasing member biasing the swinging member toward central axis of the shaft portion, wherein the swinging member detaches from the shaft portion against a biasing force of the biasing member by a centrifugal force generated at the swinging member in response to rotation of the rotational body rotating in conjunction with movement of the rotational member to switch the state of the switching mechanism to the operation allowed state in a state where the rotational member is operated to rotationally move, and the biasing force of the biasing member pushes the swinging member to make contact with the shaft portion and engages with the shaft portion by friction to retain the rotational body in a stopped state to switch the state of the switching mechanism to the movement restrained state in a state where the rotational member is stopped from making rotational movement.

2. The switching mechanism according to claim 1, wherein the swinging member includes a lever with one end being rotatably supported and an weight portion arranged on a portion of the lever, the portion distantly positioned relative to the shaft portion, the biasing member includes a spring arranged at a position close to a free end portion of the lever, and the lever swings in a direction that makes the lever move away from the shaft portion against the biasing force of the spring by the centrifugal force generated at the weight portion in response to the rotation of the rotational body.

3. The switching mechanism according to claim 2, further comprising:

an auxiliary rotational body rotatably supported on the shaft portion rotating at the shaft portion as the center of rotation, wherein the lever and the weight portion are arranged between the auxiliary rotational body and the rotational body, and one end of a swinging shaft for the lever is supported on the auxiliary rotational body and the other end of the swinging shaft for the lever is supported on the rotational body.

4. The switching mechanism according to claim 3, wherein each of the auxiliary rotational body and the rotational body includes a cut out portion formed by removing a portion from an outer peripheral surface of each of the auxiliary rotational body and the rotational body, and the weight portion includes an extending portion extending into the cut out portion of each of the auxiliary rotational body and the rotational body.

5. The switching mechanism according to claim 1, wherein the swinging member includes a pair of levers symmetrically arranged relative to central axis point of the shaft portion with one end of each of the pair of levers being rotatably supported, the swinging member includes a pair of weight portions where each of the pair of weight portions is arranged on a portion of each of the pair of levers, the portion distantly positioned relative to the shaft portion, the biasing member is configured with a pair of springs where each of the pair of springs is arranged at a position close to a free end portion of each of the pair of levers, and each of the pair of levers swings in a direction that makes each of the pair of levers move away from the shaft portion against the biasing force of each of the pair of springs by the centrifugal force generated at each of the pair of the weight portions in response to the rotation of the rotational body.

6. The switching mechanism according to claim 1, further comprising:

a stopper portion restraining swinging of the swinging member at a predetermined swing angle.

7. The switching mechanism according to claim 1, further comprising:

a gear mechanism arranged between the rotational body and the rotational member to connect the rotational body and the rotational member, wherein the rotational body increases rotational speed via the gear mechanism in a state where the rotational member is manually operated to rotationally move.

8. A switching mechanism to be arranged between a retaining member and a rotational member configured to make rotational movement relative to the retaining member, the switching mechanism switching a state between an operation allowed state where movement of the rotational member is allowed and a movement restrained state where the rotational member is retained at a selected stopped position, comprising:

a main body including a shaft portion formed in a hollow cylinder form and attaching to the retaining member;

a driving motor including an output shaft inserted through the shaft portion, the driving motor to be fixed to the main body;

a rotational body in a rotatably supported state and connecting to the rotational member, the rotational body rotating independently from the main body with the shaft portion as the center of rotation;

a swinging member swingably supported on the rotational body, the swinging member making contact with and detaching from the shaft portion in response to swinging movement of the swinging member;

a biasing member retained on the rotational body, the biasing member biasing the swinging member toward central axis of the shaft portion; and a cam member connected to the output shaft, the cam member pushing the swinging member in a direction that makes the swinging member move away from the output shaft against the biasing force of biasing member in response to rotation of the output shaft, wherein the biasing force of the biasing member pushes the swinging member to make contact with the shaft portion and engages with the shaft portion by friction to retain the rotational body in a stopped state in a state where the driving motor is not driven, the swinging member detaches from the shaft portion in response to the rotation of the output shaft via the cam member to switch the state of the switching mechanism to the operation allowed state in a state where the driving motor is driven, and the swinging member detaches from the shaft portion against the biasing force of the biasing member by a centrifugal force generated at the swinging member in response to rotation of the rotational body rotating in conjunction with movement of the rotational member to switch the state of the switching mechanism to the operation allowed state in a state where the driving motor is not driven and the rotational member is manually operated to rotationally move.

9. The switching mechanism according to claim 8, wherein the swinging member includes a lever with one end being rotatably supported and an weight portion arranged on a portion of the lever, the portion distantly positioned relative to the shaft portion, the biasing member includes a spring arranged at a position close to a free end portion of the lever, and the lever swings in a direction that makes the lever move away from the shaft portion against the biasing force of the spring by the centrifugal force generated at the weight portion in response to the rotation of the rotational body.

10. The switching mechanism according to claim 9, further comprising:

an auxiliary rotational body rotatably supported on the shaft portion rotating at the shaft portion as center of rotation, wherein the lever and the weight portion are arranged between the auxiliary rotational body and the rotational body, and one end of a swinging shaft for the lever is supported on the auxiliary rotational body and the other end of the swinging shaft for the lever is supported on the rotational body.

11. The switching mechanism according to claim 10, wherein each of the auxiliary rotational body and the rotational body includes a cut out portion formed by removing a portion from an outer peripheral surface of each of the auxiliary rotational body and the rotational body, and the weight portion includes an extending portion extending into the cut out portion of each of the auxiliary rotational body and the rotational body.

12. The switching mechanism according to claim 8, wherein the swinging member includes a pair of levers symmetrically arranged relative to central axis point of the shaft portion with one end of each of the pair of levers being rotatably supported, the swinging member includes a pair of weight portions where each of the pair of weight portions is arranged on a portion of each of the pair of levers, the portion distantly positioned relative to the shaft portion, the biasing member is configured with a pair of springs where each of the pair of springs is arranged at a position close to a free end portion of each of the pair of levers, and each of the pair of levers swings in a direction that makes each of the pair of levers move away from the shaft portion against the biasing force of each of the pair of springs by the centrifugal force generated at each of the pair of the weight portions in response to the rotation of the rotational body.

13. The switching mechanism according to claim 8, further comprising:

a stopper portion restraining swinging of the swinging member at a predetermined swing angle.

14. The switching mechanism according to claim 9, further comprising:

a first spring seat portion formed in a form having a protruding shape cross section arranged on the lever at a position close to the free end portion of the lever; and a second spring seat portion having same form as the first spring seat portion retained at a position facing the first spring seat portion, wherein an end surface of the first spring seat portion and an end surface of the second spring seat portion are arranged to face each other, the spring is retained between the first spring seat portion and the second spring seat portion, and swinging of the lever is restrained when the end surface of the first spring seat portion and the end surface of the second spring seat portion come into contact with each other.

15. The switching mechanism according to claim 8, further comprising:

a gear mechanism arranged between the rotational body and the rotational member to connect the rotational body and the rotational member, wherein a rotational output of the driving motor decreases rotational speed via the gear mechanism in a state where the driving motor is driven and the rotational body rotates in response to the rotation of the output shaft via the cam member, and the rotational body increases rotational speed via the gear mechanism in a state where the rotational member is manually operated to rotationally move in a state where the driving motor is not driven.

* * * * *